United States Patent [19]

Uno

[11] 3,890,627
[45] June 17, 1975

[54] CAMERA CONTROLS FOR BLOCKING LIGHT ENTERING THROUGH A VIEWFINDER OCULAR

[75] Inventor: Naoyuki Uno, Kawagoe, Japan

[73] Assignee: Asahi Kogaku Kogyo Kabushiki Kaisha, Japan

[22] Filed: Sept. 19, 1973

[21] Appl. No.: 398,811

[30] Foreign Application Priority Data
Sept. 21, 1972  Japan............... 47-109950

[52] U.S. Cl................ 354/224; 354/155
[51] Int. Cl. ............................. G03b 13/00
[58] Field of Search ........ 354/154, 155, 53, 224, 354/219

[56] References Cited
UNITED STATES PATENTS

| | | |
|---|---|---|
| 3,613,543 | 10/1971 | Mita et al. ................ 354/154 |
| 3,783,765 | 1/1974 | Uno et al. ................ 354/155 |
| 3,821,768 | 6/1974 | Urano et al. ................ 354/219 |

Primary Examiner—Samuel S. Matthews
Assistant Examiner—E. M. O'Connor
Attorney, Agent, or Firm—Steinberg & Blake

[57] ABSTRACT

A single lens reflex camera having a photosensitive unit in the viewfinder for internally measuring light which has travelled through the camera objective. The camera further includes controls for blocking light which enters the viewfinder through the ocular thereof so that this light cannot reach the prism of the viewfinder to be reflected thereby to the photosensitive unit for providing additional erroneous light received by the photosensitive unit. These controls operate to block the light which enters through the ocular at a time when there is no interference with the normal operation of the camera so that the operator need not even be aware of the presence of controls for blocking the light entering through the viewfinder ocular.

12 Claims, 6 Drawing Figures

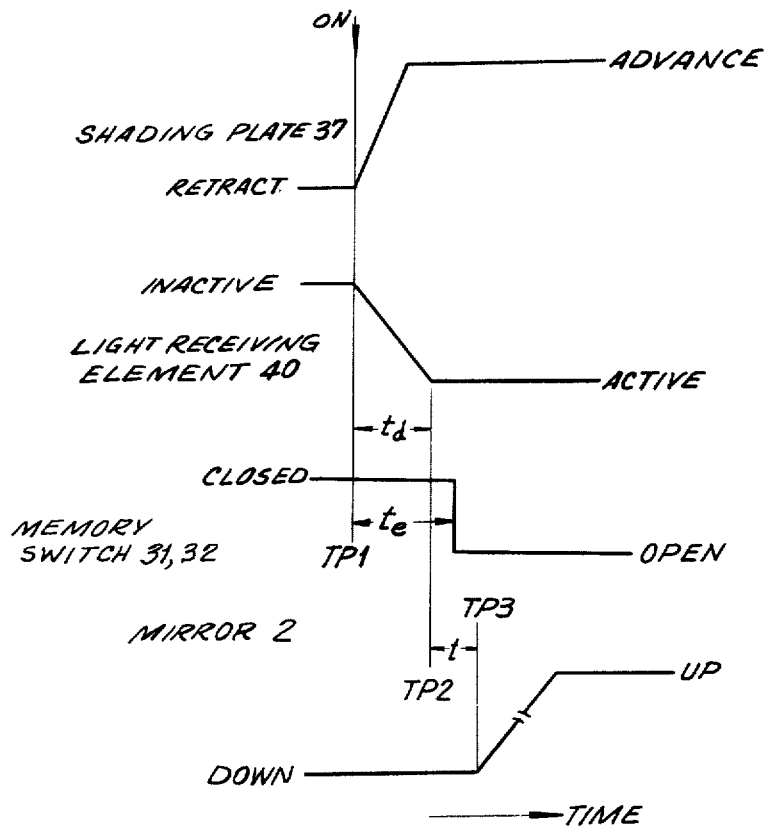
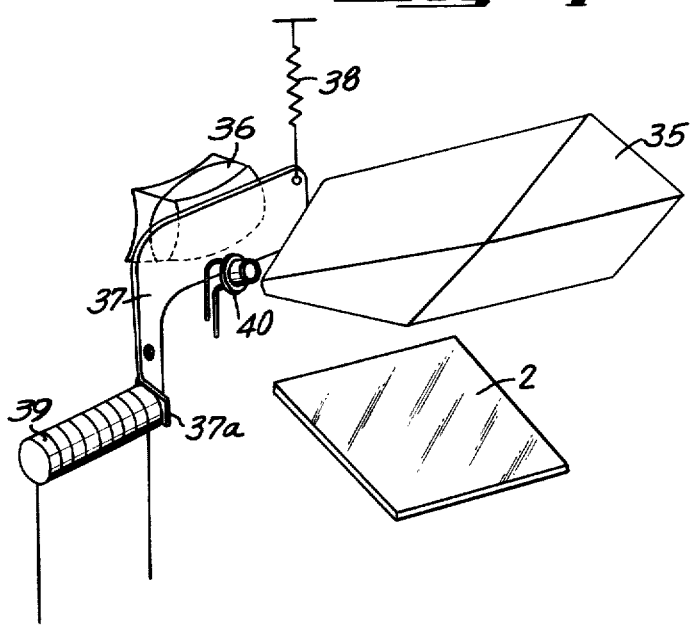

PATENTED JUN 17 1975
SHEET 2
3,890,627
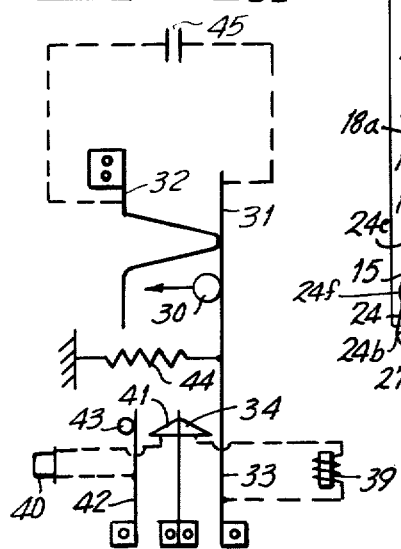
Fig-2
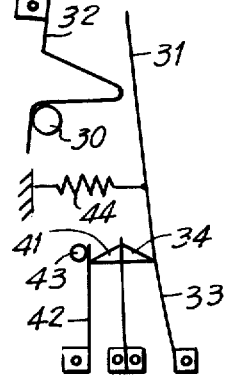
Fig-5A
Fig-5B
Fig-3
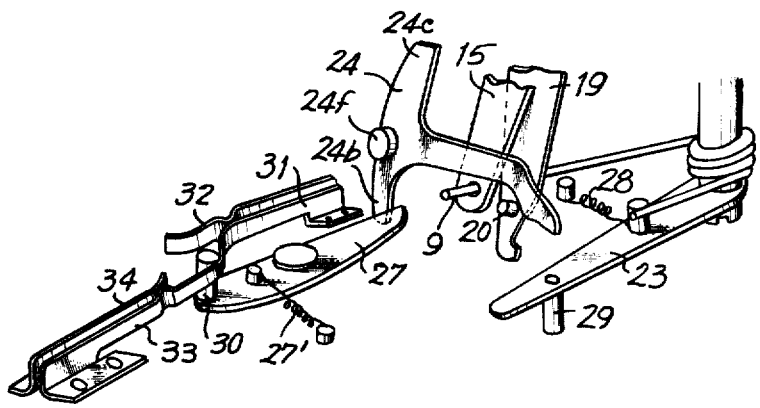

CAMERA CONTROLS FOR BLOCKING LIGHT ENTERING THROUGH A VIEWFINDER OCULAR

BACKGROUND OF THE INVENTION

The present invention relates to cameras.

More particularly, the present invention relates to single lens reflex cameras which have a photosensitive unit situated at the viewfinder to receive light which has already travelled through the objective of the camera.

Thus, it is well known that it is highly advantageous to measure light after it has travelled through the objective of the camera so that it is possible to measure in this way light which will approach as closely as possible the light which is actually received by the film during exposure. For this purpose it is well known to locate in the viewfinder at a free space between the viewfinder prism and the rear ocular a photosensitive means taking the form, for example, of a pair of photosensitive units respectively situated on opposite sides of the optical axis along which the light travels from the prism to the rear ocular. Thus, the viewfinder prism, almost always a pentaprism, has a rear light-exit surface from which the light travels not only to the ocular through which the camera operator can view an image of the object to be photographed but also to the photosensitive means so that a determination can be made of the light intensity to achieve in this way an electrical quantity which may be utilized during subsequent camera operation in order to contribute toward determination of the exposure time.

A disadvantage of this latter type of known construction resides in the fact that light which enters into the viewfinder through the rear ocular thereof can be reflected from the light-exit surface of the pentaprism to be received by the photosensitive means, and in this way the photosensitive means will receive light in addition to that which travels through the objective, so that an erroneous determination of exposure time will result. Thus, this reversely incident light is added to the intensity of the light coming from the object to be photographed so that the resulting measurement value involves an excessive error corresponding to the reversely incident light.

During most of the time when the camera is operated normally, the influence of the reversely incident light upon the measured value achieved by the photosensitive means is negligible. Thus, during normal camera operation the camera operator will have his eye close to the rear ocular so that there will be a sufficient prevention of entry of light undesirably into the viewfinder through the rear ocular. However, in those situations where the rear ocular of the viewfinder is fully exposed to ambient light, the error resulting from entry of light through the ocular and reflection thereof from the rear surface of the pentaprism to the photosensitive means is too great to be neglected. Such full exposure of the ocular to ambient light occurs under certain photographing situations as, for example, when a self-timer is used or when the ocular of the viewfinder is directed toward a source of bright light as in the case of microscopic photography.

SUMMARY OF THE INVENTION

It is accordingly a primary object of the present invention to provide a camera structure which will avoid the above drawbacks.

In particular, it is an object of the present invention to provide a camera structure which will effectively block light which enters through the viewfinder ocular so that this light cannot be reflected from the prism to the photosensitive means.

In particular, it is an object of the present invention to provide a structure of the above type which operates at a predetermined time so that the blocking of light entering through the ocular takes place in a highly effective manner which on the one hand will not provide any inconvenience to the operator and which on the other hand will effectively prevent any errors in the light measurement.

Yet another object of the present invention is to provide a structure which will automatically block the entry of light through the viewfinder ocular in such a way that the camera is operated in a conventional manner and the operator need not be aware of the presence of the light-blocking structure so that it is not possible, for example, for the operator to forget to operate the light-blocking structure while at the same time the image of the object to be photographed is capable of being seen by the operator whenever the operator chooses to look into the viewfinder.

An additional object of the present invention is to achieve the desired results with a mechanically simple and compact structure which on the one hand is very reliable in its operation and which on the other hand permits the blocking of the light to commence just prior to actual light measurement subsequent to the initiation of the depression of the shutter-operating plunger of the camera and while the inclined mirror is still in its lower viewing position prior to tripping of the shutter, so that the blocking of light entering through the viewfinder ocular occurs only during a relatively small time period which occurs in a proper sequence with respect to a series of operations resulting from depression of the shutter-operating plunger such as control of a memory switch, driving up of the mirror, and tripping of the shutter.

In accordance with the invention the camera has an inclined mirror swingable from a lower viewing position to an upper exposure position. When the mirror is in its lower viewing position it directs light up to the viewfinder to provide the operator with an image of the object to be photographed, and the viewfinder includes a prism situated over the mirror and an ocular situated behind the prism so that the operator can look into the viewfinder through this ocular. Behind the prism there is a free space through which the light travels from the prism to the ocular, and a photosensitive means situated in this free space to receive light from the rear surface of the prism so that it is this light which is measured. The photosensitive means forms part of an electrical circuit which achieves in a known way an electrical quantity which is memorized so as to be retained and utilized during film exposure, and for the purpose of memorizing this electircal quantity the camera circuitry includes a memory switch means which must be displaced from a normal position to an operating position in order to render the memory means operative to retain the electrical quantity resulting from light measurement by the photosensitive means. A light-blocking means is movable between a light-blocking position situated in the above free space between the photosensitive means and the ocular and a nonblocking position situated beyond the path of light travel from the prism to the ocular, and a moving means is operatively connected with the light-blocking means to move latter from its non-blocking to its blocking position. In accordance with a further feature of the invention a motion-transmitting means is operatively connected with the memory switch means and with the moving means to operate first on the moving means to situate the light-blocking means in its blocking position and then on the memory switch means to place the latter in its operating position. In this way when the camera circuitry operates to memorize the electrical quantity resulting from light measurement the light-blocking means will have already been placed in its light-blocking position.

BRIEF DESCRIPTION OF DRAWINGS

The invention is illustrated by way of example in the accompanying drawings which form part of this application and in which:

FIG. 1 is a diagrammatic representation of the sequence of operation of various components which form part of the structure of the invention;

FIG. 2 is a schematic side elevation of part of the structure of the invention which is situated at a mirror box;

FIG. 3 is a fragmentary perspective view schematically illustrating controls of the invention;

FIG. 4 is a schematic perspective illustration of the viewfinder and light-blocking means as well as structure for controlling the latter;

FIG. 5A is a schematic representation of the initial position of various switches with FIG. 5A schematically showing components controlled by the switches; and FIG. 5B shows the position which the switch structure of FIG. 5A takes subsequent to the position thereof shown in FIG. 5A.

DESCRIPTION OF PREFERRED EMBODIMENTS

Referring to the drawings and to FIG. 2 in particular, there is schematically represented therein a mirror box 1 which in a well known manner houses in its interior the swingable mirror 2. This mirror 2 normally occupies the inclined viewing position shown in FIG. 2. Thus, the mirror 2 is supported for swinging movement about a horizontal axis situated at the region of the top rear edge of the mirror, as schematically represented in FIG. 2. Thus, the box 1 is open at its right end, as viewed in FIG. 2, in order to receive light from the unillustrated objective, this light being reflected by the mirror 2, when it is in its lower viewing position shown in FIG. 2, up to the viewfinder, as described in greater detail below in connection with FIG. 4.

The swingable mirror 2 fixedly carries a pin 3 extending through an arcuate slot in the illustrated side wall of the box 1, and a spring 4 presses downwardly on the pin 3 so as to urge the mirror 2 into its lower viewing position shown in FIG. 2. The spring 4 extends around a pin 6 and at its upper right end engages a stationary member, as illustrated. In order to drive the mirror upwardly there is a motion-transmitting means which includes a mirror-drive means, and this mirror-drive means includes the lever 5 which is swingable on the pin 6. Thus when the lever 5 swings in a clockwise direction from the position of FIG. 2 around the pin 6 the upper rear edge portion of the lever 5 will engage the pin 3 so as to drive the mirror upwardly in opposition to the spring 4.

The motion-transmitting means includes a shutter-opening means for actuating a shutter-tripping means to trip the shutter so that it will open in order to make an exposure. This part of the motion-transmitting means is formed by a swingable lever 8 supported for swinging movement on a suitable pin as illustrated in FIG. 2. A wire spring urges the lower end of the lever 8 into engagement with a pin 7 carried by the lever 5. Thus, the lever 8 forms the shutter-opening means, and in the path of swinging movement of the upper end of the lever 8 is located the shutter-tripping means 25 in the form of an element which in a known way is displaced slightly to the left, as viewed in FIG. 2, in order to trip the shutter and thus cause it to open and make the exposure.

The mirror-drive means, which forms part of the motion-transmitting means as pointed out above, further includes a mirror-driving lever means 15 supported for swinging movement on a pin 14 carried by the wall of the box 1 which is visible in FIG. 2. As is shown in FIG. 3, a spring 9 is operatively connected with the mirror-driving lever 15 in order to urge the latter to swing in a counter-clockwise direction, as viewed in FIG. 2, around the pin 14. The lever 15 has a rearwardly extending arm 15a carrying a roller 16 which extends across the rear edge of a diaphragm-control lever means 18. This diaphragm-control lever means 18 is in the form of a substantially L-shaped lever having a downwardly extending leg across which the roller 16 extends as illustrated in FIG. 2. This lever 18 which is supported for swinging movement on the pin 18a has a forwardly extending substantially horizontal leg terminating at its right end, viewed in FIG. 2, in a structure for controlling the diaphragm in a well known manner.

The mirror driving lever means 15 further includes an arm 15b carrying a roller 17 which engages the mirror-driving lever 5 so as to swing the latter upwardly when the lever means 15 swings in a counterclockwise direction, as viewed in FIG. 2, around the pin 14.

The motion-transmitting means further includes a release-lever means 19 also swingably mounted on the pin 14, the lever means 19 being situated behind the lever 15 between the latter and the wall of the box 1 which is visible in FIG. 2. A spring means 26, which forms part of the motion-transmitting means, is tensioned between and connected to the release lever means 19 and the diaphragm-control lever means 18.

The lower end of the release lever means 19 cooperates with a cocking lever 23. This lever 23, which is shown most clearly in FIG. 3, is restored by a spring 28 to the position shown in FIG. 2, after an exposure has been made, so that the return of the lever 23 to the position of FIG. 2 swings the release lever means 19 into its initial position shown in FIG. 2. The release lever means 19 carries a plate 21 which is directly engaged by a manually operable release means 22. This manually operable release means normally occupies the holding position shown in FIG. 2 where the lever 22 prevents the lever 19 from swinging in a counterclockwise direction about the pin 14. The lever 22 is connected in a known way to the shutter-operating plunger of the camera so that at the initial part of the movement of the shutter-operating plunger the release means 22 is displaced by the operator from the holding position shown in FIG. 2 in a counterclockwise direction to a release position releasing the release lever means 19 for swinging movement in a counterclockwise direction about the pin 14, as pointed out above.

The release lever means 19 carries a pin 20 situated in the path of movement of the mirror-driving lever 15 so that the latter cannot turn until the lever 19 has first turned in a counterclockwise direction from the initial position thereof shown in FIG. 2. After the spring 28 has restored the lever 23 to its position shown in FIG. 2 where the parts are placed in the position shown in FIG. 2, the sutter cocking structure turns the lever 23 in opposition to the spring 28 in order to cock the shutter and store a driving force in the spring 9. Thus when the operator turns the film-advancing and shutter-cocking lever there is an unillustrated transmission of motion from this lever to the pin 29 which is carried by the lever 23, so that simultaneously with cocking of the shutter and transportation of the film the lever 23 is swung in opposition to the spring 28 in order to store in the spring 9 a force for driving the lever 15.

In addition to the above components for driving the mirror upwardly and tripping the shutter, the motion-transmitting means includes a switch-operating means formed in part by a substantially T-shaped lever 24 supported for swinging movement on a pin 24f carried by the wall of the box 1 which is visible in FIG. 2. This lever 24 of the switch-operating means has a horizontally extennding arm provided with a lower edge engaged by the pin 20 so that the pin 20 in cooperation with the lower edge of the lever 24 will control the swinging of the latter. The switch-operating means further includes a lever 27 supported for swinging movement about an axis extending vertically between the ends of the lever 27, this lever 27 having a right end, as viewed in FIG. 3, engaging the downwardly extending arm 24b of the switch-operating lever 24. This lever 24 has the horizontally extending arm 24a which has its lower edge in engagement with the pin 20 as illustrated. Moreover, the lever 24 has an upwardly extending arm 24c situated directly beneath the roller 16 so that the mirror-driving lever means 15 cannot be driven by the spring 9 until the arm 24c of the switch-operating lever means swings away from its position illustrated in FIG. 2 beneath the roller 16.

The lever 27 which thus turns with the lever 24 is urged into engagement with the arm 24b of the lever 24 by a spring 27'. This lever 27 carries at its end distant from the lever 24 a switch-actuating pin 30 made of an electrically non-conductive material. In the rest position of the parts shown in FIG. 3, the insulating pin 30 engages a springy switch arm 33 to maintain the latter out of engagement with a switch arm 34, so that the switch means formed by components 33, 34 is maintained in its open position by the insulating pin 30 when the parts have the initial position shown in FIGS. 2 and 3.

Referring now to FIG. 4, the switch means 33, 34 forms a blocking switch means and is electrically connected with an electromagnetic means 39 for energizing the latter when the switch means 33, 34 is closed. This electromagnetic means 39 forms an electrical, automatically operable moving means and includes an armature 37a which is attracted to the core of the electromagnetic means when the latter is energized. The armature 37a is situated at the lower end of a swingable light-blocking means 37 urged by a spring 38 to a non-blocking position which the light-blocking means 37 assumes when the electromagnetic means 39 is not energized.

As is schematically shown in FIG. 4, the mirror 2 reflects light upwardly to the viewfinder which includes the pentaprism 35 and the ocular 36 through which the operator looks into the viewfinder. Thus, the rear exit surface of the prism 35 is spaced from the ocular 36, and the light travels from the prism 35 to the ocular 36. In the free space which is in the viewfinder behind the prism 35 there is the photosensitive means 40 in the form of any suitable light-receiving unit capable of receiving light from the prism 35 so as to measure the light and convert the same into an electrical quantity to be memorized and utilized during exposure of the film. The light-blocking means 37 is movable by the moving means formed by the electromagnetic means 39 from the non-blocking position situated beyond the path of light travel from the prism 35 to the ocular 36 into the illustrated blocking position where the light-blocking means 37 prevents light which enters the viewfinder means through the ocular 37 from reaching the rear light-exit surface of the prism 35 so that in this way light cannot be reflected, when the light-blocking means 37 is in its illustrated blocking position, from the prism 35 to the photosensitive means 40, and in this way erroneous reception of additional light is avoided. Thus, when the switch-operating means 24, 27 is operated to displace the insulating pin 30 to the left, as viewed in FIG. 5A, from the switch element 33 the latter will move into engagement with the switch element 34 so as to energize an electromagnetic means 39 as schematically shown in FIG. 5A. FIG. 5A schematically shows a spring 44, representing the spring force inherent in the springy element 33, urging the element 33 into engagement with the element 34.

FIG. 3 also illustrates the memory switch means 31, 32. This memory switch means includes the springy switch arm 31 which forms an extension of the switch arm 33 and the switch element 32. These switch elements 31, 32 normally engage each other so that in its normal position the memory switch means 31, 32 is closed. However, when the insulating pin 30 is displaced away from the switch element 33 it is also displaced away from the switch element 31 and into engagement with the switch element 32 so as to move the latter away from element 31 and thus open the switch means 31, 32. As is schematically shown in FIG. 5A, the memory switch means 31, 32 is electrically connected in parallel across a memory means 45 in the form of a suitable capacitor which is charged in accordance with the light received by the photosensitive means 40, in a well known manner. Because the memory switch means 31, 32 is connected in parallel across the capacitor 45, the latter will not be charged until the switch means 31, 32 assumes the operating open position rendering the memory means 45 operative to receive a charge in response to the light which is received by the photosensitive means 40.

In addition, FIG. 5A illustrates a switch means 41, 42 for rendering the photosensitive means 40 operative. This switch means may conveniently include the element 41 connected with the element 34 so as to move therewith. When the switch element 33 engages the element 34, the latter together with the element 41 are displaced slightly to the left, as viewed in FIG. 5A, so that in this way element 41 is brought into engagement with switch element 42, thus closing the switch means 41, 42 for rendering the photosensitive means 40 operative. FIG. 5B illustrates the position which the parts of FIG. 5A assume after operation of the switch-operating means 24, 27. Thus it will be seen from FIG. 5B that the switch means 33, 34 is closed, the switch means 41, 42 is closed, and the switch means 31, 32 is open. Moreover, it is clear that the sequence of operation is such that first the switch means 33, 34 closes, then the switch means 41, 42 closes, and finally the switch means 31, 32 opens. In this way the moving means formed by the electromagnetic means 39 will be operated before the memory switch means assumes its operative position, and the photosensitive means will be rendered operative just after the energizing of the electromagnetic means 39 and prior to opening of the memory switch means 31, 32.

The horizontally extending arm 24a of the lever 24 of the switch-operating means has adjacent its right free end 24e, as viewed in FIG. 2, a lower edge portion 24d which has a predetermined configuration for providing the desired cooperation with the pin 20 carried by the release lever means 19.

The structure described above operates in the following manner:

It is assumed that the parts have the position shown in FIG. 2 with the shutter cocked, the film transported, and the element 23 displaced to the right beyond the position shown in FIG. 2 forwardly away from the lower end of the lever 19 so as to tension the spring 9. With the parts thus positioned the operator will depress the shutter-operating plunger, and the initial part of the downward movement of this plunger will result in counterclockwise turning of the release means 22 so that the left free end thereof will move downwardly away from the plate 21 of the release lever means 19 which forms part of the motion-transmitting means as pointed out above. The tension which is stored at this time in the spring 26 is sufficient for swinging the release lever means 19 around the pin 14, so that the first operation which takes place with the motion-transmitting means is the swinging of the release lever means 19 thereof. The pin 20 therefore moves along the lower edge of the arm 24a toward the end portion 24e and thus swings the lever 24 around the pin 24f in a counterclockwise direction, as viewed in FIG. 2. The result is that the lever 27 swings in a clockwise direction, in opposition to the spring 27', moving the insulating pin 30 to the left, as viewed in FIG. 5A, away from the switch element 33 which thus moves into engagement with the switch element 34. The closing of the switch means 33, 34 results in energizing of the electromagnetic means 39 so that the light-blocking means 37 is displaced in opposition to the spring 38 to the light-blocking position shown in FIG. 4.

As the pin 20 continues to move along the edge portion 24d toward the free end 24e of the arm 24a, the lever 24 continues to swing the lever 27 in opposition to the spring 27', so that the pin 30 approaches the switch element 32. Immediately after closing of the switch 33, 34, the switch 41, 42 closes so as to render the photosensitive means 40 operative, and then the insulating pin 30 will displace the element 32 away from the element 31, so that the parts will now have the position shown in FIG. 5B, and of course the memory means 45 is now rendered operative, as pointed out above.

At this time the arm 24c has swung out of the path of movement of the roller 16, so that the spring 9 is now free to turn the lever 15 in a counterclockwise direction around the pin 14, as viewed in FIG. 2, with the result that the roller 16 drives the diaphragm-control lever means 18 so as to stop the diaphragm down to the preselected aperture, and at the same time the roller 17 engages the lever 5 so as to cause the latter to swing the mirror up to its exposure position. Simultaneously with the turning of the lever 5, the pin 7 thereof swings the lever 8 so as to cause the shutter-tripping means 25 to be moved for opening the shutter and thus starting the exposure.

The sequence of operation of the various components referred to above is graphically illustrated in FIG. 1. Thus it will be seen that in FIG. 1 elapse of time extends along a horizontal abscissa toward the right. At the time point TP1 the moving means formed by the electromagnetic means 39 is energized by closing of the switch means 33, 34, and thus the plate 37 which forms the light-blocking means is displaced from its retracted to its advanced position, as illustrated in FIG. 1, this light-blocking means 39 being in its light-blocking position prior to the time point TP2 which occurs at a time interval $t_d$ subsequent to the time point TP1. It is at this time point TP2 that the photosensitive means 40 has been rendered operative by closing of the switch 41, 42 immediately subsequent to closing of the switch 33, 34. It is only after the interval $t_e$ that the memory switch means 31, 32 is displaced to its open position so as to render the memory means 45 operative. It will be noted that the interval $t_e$ is greater than the interval $t_d$. The interval $t_e$ from closure of the switch 33, 34 to opening of the switch 31, 32 is selected so as to be at least equal to and preferably slightly greater that the interval $t_d$ from closing of the switch 31, 32 and activation of the photosensitive means 40. It is only at the time point TP3 which occurs after the time point TP2 by the interval $t$ that the mirror-drive means of the motion-transmitting means swings the mirror up to its exposure position, as described above. Thus, prior to the initiation of the upward swinging of the mirror 2, the light-blocking means is displaced to its light-blocking position, and the memory switch means 31, 32 is rendered operative. In the illustrated example the photosensitive means 40 is activated after displacement of the light-blocking means 37 to its blocking position but before opening of the memory switch means 31, 32. Of course, it is only after the lever 5 of the mirror-drive means starts to swing upwardly to bring about upward swinging of the mirror 2 that the shutter-operating means 8 of the motion-transmitting means is turned sufficiently to cause the tripping of the shutter to take place by actuation of the shutter-tripping means 25. Therefore, upon opening of the shutter the mirror is in its upper exposure position, where it will not interfere with travel of light from the objective to the film, and of course prior to the upward swinging of the mirror the memory means 45 has already received the charge which represents the electrical quantity corresponding to the light intensity which is to be memorized since the photosensitive means 40 cannot receive light when the mirror is in its upper position during exposure of film.

Thus it will be seen that with the above-described structure of the invention, it is not possible for light which enters the viewfinder through the ocular 36 to reach the prism 35 and be reflected thereby to the photosensitive means 40 during the period of time when the memory switch means 31, 32 has been rendered operative. The moving means in the form of an electromagnet provides an exceedingly simple, compact and reliable mechanism for swinging the light-blocking means between its non-blocking and blocking position, and this structure occupies an extremely small space so that there is no difficulty in accommodating the structure of the invention in a camera. Furthermore it will be noted that the camera is operated in a conventional manner so that the operator is in no way concerned with the light-blocking means.

When an exposure has been completed, the spring 28 returns the lever 23 to the position indicated schematically in FIG. 2, so that the parts again assume the position shown in FIG. 2, and as soon as the holding plate 21 carried by the release lever means 19 reaches the position shown in FIG. 2, a spring which acts on the manually operable release means 22 swings the latter to the position shown in FIG. 2 where it engages the holding plate 21 so as to retain the parts in the position shown in FIG. 2.

What is claimed is:

1. In a single lens reflex camera, mirror means movable between a lower viewing position and an upper exposure position, viewfinder means situated over said mirror means for receiving light reflected therefrom when said mirror means is in said lower viewing position thereof, said viewfinder means including a rear ocular for the camera operator and a prism in front of said ocular and over said mirror means for directing light from said mirror means to said ocular, said viewfinder means having behind said prism a free space through which light travels from said prism to said ocular, photosensitive means situated in said free space to receive light from said prism when said miror means is in said lower viewing position thereof to provide an electrical quantity, memory means for retaining said electrical quantity for utilization in determining the extent of exposure, light-blocking means having a blocking position situated in said free space between said ocular and photosensitive means to prevent light which enters said viewfinder means through said ocular from reaching said prism to be reflected thereby to said photosensitive means, said light-blocking means having a non-blocking position situated beyond the path of light travel from said prism to said ocular, electrical, automatically operable moving means operatively connected with said light-blocking means for automatically moving the latter from said non-blocking to said blocking position thereof, blocking switch means electrically connected with said electrical moving means for automatically actuating the latter, memory switch means having a normal position preventing operation of the memory means and an operating position rendering said memory means operative, shutter-tripping means for tripping a shutter of the camera to initiate an exposure, manually operable release means having a normal holding position and being movable by the operator from said holding position to a release position, and motion-transmitting means held by said manually operable release means in a predetermined starting position when said manually operable release means is in said holding position thereof, said motion-transmitting means being released for movement from said starting position thereof when said manually operable release means is displaced by the operator to said release position thereof, said motion-transmitting means being operatively connected with said blocking switch means, said memory switch means, said mirror means, and said shutter-tripping means for operating all of the latter means in a sequence according to which said blocking switch means is first actuated for first operating said moving means automatically to move said light-blocking means to said blocking position thereof, said memory switch means is then operated to be displaced from said normal to said operating position thereof, said mirror means is then at least started by said motion-transmitting means to move from said lower viewing position to said upper exposure position thereof, and said shutter-tripping means is then actuated by said motion-transmitting means to open the camera shutter.

2. The combination of claim 1 and wherein said memory switch means is normally closed and is open when in said operating position thereof.

3. The combination of claim 1 and wherein said electrical, automatically operable moving means is an electromagnet means electrically connected with said blocking switch means to be operated automatically thereby.

4. In a single lens reflex camera, mirror means movable between a lower viewing position and an upper exposure position, viewfinder means situated over said mirror means for receiving light reflected therefrom when said mirror means is in said lower viewing position thereof, said viewfinder means including a rear ocular for the camera operator and a prism in front of said ocular and over said mirror means for directing light from said mirror means to said ocular, said viewfinder means having behind said prism a free space through which light travels from said prism to said ocular, photosensitive means situated in said free space to receive light from said prism when said mirror means is in said lower viewing position thereof to provide an electrical quantity, memory means for retaining said electrical quantity for utilization in determining the extent of exposure, light-blocking means having a blocking position situated in said free space between said ocular and photosensitive means to prevent light which enters said viewfinder means through said ocular from reaching said prism to be reflected thereby to said photosensitive means, said light-blocking means having a non-blocking position situated beyond the path of light travel from said prism to said ocular, moving means operatively connected with said light-blocking means for moving the latter from said non-blocking to said blocking position thereof, memory switch means having a normal position preventing operation of the memory means and an operating position rendering said memory means operative, shutter-tripping means for tripping a shutter of the camera to initiate an exposure, manually operable release means having a normal holding position and being movable by the operator from said holding position to a release position, and motion-transmitting means held by said manually operable release means in a predetermined starting position when said manually operable release means is in said holding position thereof, said motion-transmitting means being released for movement from said starting position thereof when said manually operable release means is displaced by the operator to said release position thereof, said motion-transmitting means being operatively connected with said moving means, said memory switch means, said mirror means, and said shutter-tripping means for operating all of the latter means in a sequence according to which said moving means is first operated to move said light-blocking means to said blocking position thereof, said memory switch means is then operated to be displaced from said normal to said operating position thereof, said mirror means is then at least started by said motion-transmitting means to move from said lower viewing position to said upper exposure position thereof, and said shutter-tripping means is then actuated by said motion-transmitting means to open the camera shutter, said motion-transmitting means including a mirror-drive means for driving the mirror means from said lower viewing position to said upper position thereof and a switch-operating means for displacing said memory switch means from said normal to said operating position thereof, said switch-operating means cooperating with said mirror-drive means to block the same against operation until said memory switch means has been displaced by said switch-operating means to said operating position thereof.

5. In a single lens reflex camera, mirror means movable between a lower viewing position and an upper exposure position, viewfinder means situated over said mirror means for receiving light reflected therefrom when said mirror means is in said lower viewing position thereof, said viewfinder means including a rear ocular for the camera operator and a prism in front of said ocular and over said mirror means for directing light from said mirror means to said ocular, said viewfinder means having behind said prism a free space through which light travels from said prism to said ocular, photosensitive means situated in said free space to receive light from said prism when said mirror means is in said lower viewing position thereof to provide an electrical quantity, memory means for retaining said electrical quantity for utilization in determining the extent of exposure, light-blocking means having a blocking position situated in said free space between said ocular and photosensitive means to prevent light which enters said viewfinder means through said ocular from reaching said prism to be reflected thereby to said photosensitive means, said light-blocking means having a non-blocking position situated beyond the path of light travel from said prism to said ocular, moving means operatively connected with said light-blocking means for moving the latter from said non-blocking to said blocking position thereof, memory switch means having a normal position preventing operation of the memory means and an operating position rendering said memory means operative, shutter-tripping means for tripping a shutter of the camera to initiate an exposure, manually operable release means having a normal holding position and being movable by the operator from said holding position to a release position, the motion-transmitting means held by said manually operable release means in a predetermined starting position when said manually operable release means is in said holding position thereof, said motion-transmitting means being released for movement from said starting position thereof when said manually operable release means is displaced by the operator to said release position thereof, said motion-transmitting means being operatively connected with said moving means, said memory switch means, said mirror means, and said shutter-tripping means for operating all of the latter means in a sequence according to which said moving means is first operated to move said light-blocking means to said blocking position thereof, said memory switch means is then operated to be displaced from said normal to said operating position thereof, said mirror means is then at least started by said motion-transmitting means to move from said lower viewing position to said upper exposure position thereof, and said shutter-tripping means is then actuated by said motion-transmitting means to open the camera shutter, said moving means including an electromagnetic means which when energized displaces said light-blocking means from said non-blocking to said blocking position thereof and an additionally normally open blocking switch means electrically connected with said electromagnetic means for energizing the latter when said blocking switch means is closed, said motion-transmitting means including a switch-operating means operatively connected with said blocking switch means for closing the latter and a mirror-drive means for driving said mirror means from said lower viewing position to said upper exposure position thereof, said switch-operating means cooperating with said mirror-drive means to prevent operation thereof until said switch-operating means has operated to an extent sufficient to provide for closure of said blocking switch means.

6. The combination of claim 5 and wherein said switch-operating means is also operatively connected with said memory switch means for placing the latter in said operating position immediately after closing said blocking switch means and said switch-operating means cooperating with said mirror-drive means for preventing operation thereof until said blocking switch means is closed and said memory switch means is in said operative position thereof.

7. The combination of claim 6 and wherein a third switch means is electrically connected with said photosensitive means for rendering the latter operative, and said switch-operating means cooperating also with said third switch means for actuating the latter to render said photosensitive means operative during a time interval extending between the closure of said blocking switch means and the displacement of said memory switch means to said operative position thereof.

8. In a single lens reflex camera, mirror means movable between a lower viewing position and an upper exposure position, viewfinder means situated over said mirror means for receiving light reflected therefrom when said mirror means is in said lower viewing position thereof, said viewfinder means including a rear ocular for the camera operator and a prism in front of said ocular and over said mirror means for directing light from said mirror means to said ocular, said viewfinder means having behind said prism a free space through which light travels from said prism to said ocular, photosensitive means situated in said free space to receive light from said prism when said mirror means is in said lower viewing position thereof to provide an electrical quantity, memory switch means for retaining said electrical quantity for utilization in determining the extent of exposure, light-blocking means having a blocking position situated in said free space between said ocular and photosensitive means to prevent light which enters said viewfinder means through said ocular from reaching said prism to be reflected thereby to said photosensitive means, said light-blocking means having a non-blocking position situated beyond the path of light travel from said prism to said ocular moving means operatively connected with said light-blocking means for moving the latter from said non-blocking to said blocking position thereof, memory switch means having a normal position preventing operation of the memory means and an operating position rendering said memory means operative, shutter-tripping means for tripping a shutter of the camera to initiate an exposure, manually operable release means having a normal holding position and being movable by the operator from said holding position to a release position, and motion-transmitting means held by said manually operable releast means in a predetermined starting position when said manually operable release means is in said holding position thereof, said motion-transmitting means being released for movement from said starting position thereof when said manually operable release means is displaced by the operator to said release position thereof, said motion-transmitting means being operatively connected with said moving means, said memory switch means, said mirror means, and said shutter-tripping means for operating all of the latter means in a sequence according to which said moving means is first operated to move said light-blocking means to said blocking position thereof, said memory switch means is then operated to be displaced from said normal to said operating position thereof, said mirror means is then at least started by said motion-transmitting means to move from said lower viewing position to said upper exposure position thereof, and said shutter-tripping means is then actuated by said motion-transmitting means to open the camera shutter, said motion-transmitting means including a mirror-driving lever means for driving said mirror means from said lower viewing position to said upper exposure position thereof, a switch-operating lever means for displacing said memory switch means from said normal to said operating position thereof, said switch-operating lever means having an initial position blocking movement of said mirror-driving lever means, and a release lever means which moves before said switch-operating lever means and said mirror-driving lever means upon displacement of said manually operable release means from said holding to said release position thereof, said release lever means cooperating with said switch-operating lever means for first actuating the latter to displace said memory switch means from said normal to said operating position thereof, and said release lever means when thus operating said switch-operating lever means displacing the latter to a location where it no longer blocks operation of said mirror-driving lever means.

9. The combination of claim 8 and wherein a shutter-operating lever means forms part of said motion-transmitting means and cooperates with said mirror-driving lever means to be driven thereby for acutating said shutter-tripping means to trip the shutter.

10. The combination of claim 8 and wherein said moving means includes an electromagnetic means which when energized moves said light-blocking means from said non-blocking to said blocking position thereof and blocking switch means having a normally open position and electrically connected with said electromagnetic means for energizing the latter when said blocking switch means is closed, said switch-operating means being operatively connected both with said blocking switch means and with said memory switch means for first bringing about closure of said blocking switch means and for then displacing said memory switch means to said operative position thereof in response to operation of said switch-operating means by said release lever means, prior to displacement of said switch-operating means to release said mirror-driving lever means for operation.

11. The combination of claim 10 and wherein a diaphragm-control lever means for controlling a diaphragm of the camera is operatively connected with said mirror-driving lever means to be operated thereby, and said motion-transmitting means including a spring means connected between said release lever means and said diaphragm-control lever means for moving said release lever means upon displacement of said manually operable release means from said holding to said release position thereof.

12. The combination of claim 11 and wherein said motion-transmitting means further includes a shutter-operating lever means operatively connected with said mirror-driving lever means to be operated thereby for actuating said shutter-tripping means.

* * * * *